(12) United States Patent
Ikegaya et al.

(10) Patent No.: US 6,980,687 B2
(45) Date of Patent: Dec. 27, 2005

(54) CHIP INSPECTING APPARATUS AND METHOD

(75) Inventors: Kanji Ikegaya, Tokyo (JP); Takashi Ito, Tokyo (JP); Takaaki Ishii, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 574 days.

(21) Appl. No.: 09/968,608

(22) Filed: Oct. 2, 2001

(65) Prior Publication Data

US 2002/0090129 A1    Jul. 11, 2002

(30) Foreign Application Priority Data

Oct. 2, 2000  (JP)  .............................. 2000-301825
Oct. 2, 2000  (JP)  .............................. 2000-301929

(51) Int. Cl.⁷ ............................................. G06K 9/00
(52) U.S. Cl. ....................... 382/149; 382/146; 382/151
(58) Field of Search ........................ 382/141, 143–152; 348/86, 87, 125, 126; 356/237.1, 237.4, 237.5, 356/394; 700/95–97, 110, 131; 702/83

(56) References Cited

U.S. PATENT DOCUMENTS

| | | | | |
|---|---|---|---|---|
| 4,056,716 A | * | 11/1977 | Baxter et al. ................ 382/148 |
| 5,086,477 A | * | 2/1992 | Yu et al. ...................... 382/145 |
| 5,966,459 A | * | 10/1999 | Chen et al. .................. 382/149 |
| 5,978,078 A | * | 11/1999 | Salamati-Saradh et al. ............. 356/237.1 |
| 5,991,699 A | * | 11/1999 | Kulkarni et al. ............... 702/83 |
| 6,040,911 A | * | 3/2000 | Nozaki et al. .............. 356/394 |

* cited by examiner

*Primary Examiner*—Vikkram Bali
(74) *Attorney, Agent, or Firm*—Foley & Lardner LLP

(57) ABSTRACT

A method and apparatus for inspecting chips formed as a fine pattern on a surface of an object to be inspected, in which one visual field of an optical observation system is divided into a plurality of areas. A plurality of predetermined good chips are arranged sequentially to each area. Image data of the predetermined good chips are stored at each specific position of the area. In addition, one visual field of the optical observation system is divided into a plurality of areas. When a plurality of good chips are observed in one visual field, coordinates of each good chip are memorized. When good chips in the visual field during learning are recognized, image of the area is obtained as a learned image. Even if the plurality of chips in one visual field of the optical observation system are not entirely nondefective, it can inspect effectively the chips. Further, a problem caused by distortion (distortion aberration) in the optical observation system can be solved.

7 Claims, 6 Drawing Sheets

END

CHIP INSPECTING APPARATUS AND METHOD

FIELD OF THE INVENTION

This invention relates to a method and apparatus for inspecting a plurality of chips formed as a fine pattern on a surface of an object to be inspected, such as a wafer or the like.

RELATED ART

General methods for inspecting a plurality of chips of this kind are shown in the following (1) and (2).

(1) Learning is carried out by one visual field.

Pattern matching is carried out for the plurality of chips by one visual field in an optical observation system. For example, all the plurality of chips patterned are judged to be good chips by visual observation. Image data of the good chips are stored and memorized as a master. When the other plurality of chips patterned are inspected, the master of the good chips is memorized, and the plurality of chips to be inspected are compared by image data so as to obtain a difference on the images. Thereby, defects and foreign objects or the like to be detected in the plurality of chips are detected.

Conventionally, each visual image is stored and memorized concerning about the plurality of good chips patterned so as to evaluate an average value of each image data of the plurality of chips. That is, the master is formed by averaging each learning of the plurality of chips.

(2) Image data of the good chips, which are learned in one of the divided plural areas, are copied to the other area.

This process is quick, because it is processed by software. Learning operation is finished at one time.

The foregoing method has problems as follows:

(1) When learning is carried out by one visual field.

All the plurality of chips to be stored as a master must be nondefective. In other words, good chips should be inspected in whole areas. It requires a lot of time to find a state matched with such a condition.

Further, inspection for nondefective or not is done by visual observation of an operator. However, since all the chips in the visual field must be inspected by visual observation, it requires a lot of time and loads for the operator.

Further, the conditions such that all the chips in one visual field are nondefective cannot be prepared within an allowed time as much as a necessary number of times.

(2) When the image data of the good chips, which are learned in one of the divided areas, are copied for using in the other area.

Conventionally, since the average value of the image data of the plurality of chips (average of learning the plurality of chips) is obtained, distortion (distortion aberration) in the optical observation system is averaged to a certain extent.

However, when one visual field of the optical observation system is divided into a plurality of areas so as to use the image data of the good chips learned in one of the divided areas by copying to the other area, distortion (distortion aberration) in the optical observation system is likely to cause a problem.

There are some kinds of distortion (distortion aberration), such as a spool aberration type or a barrel type, which give no similar imaging (CCD sensor photo receptor surface) to a figure of the chips. Aberration (distortion) is formed when plane chips vertical to the optical axis are not similarly imaged on an image surface vertical to the optical axis. For example, there are cases in which a square figure deforms intermediate side portions like a spool or swells intermediates like a barrel.

Thus, when distortion (distortion aberration) in the optical observation system occurs, good chips are decided by errors to be defective ones, because image data (pattern) are different between a vicinity of the optical axis and a circumferential part, even as to the same chip. Therefore, it is difficult to inspect chips with high accuracy. Further, inspection becomes very troublesome.

SUMMERY OF THE INVENTION

One object of the invention is to provide a method and apparatus for inspecting chips, which can inspect chips efficiently even if a plurality of chips in one visual field of a visual observation system are not totally nondefective.

Another object of the invention is to provide a method and apparatus for inspecting chips, which can solve problems caused by distortion (distortion aberration) in an optical observation system.

This invention relates to an improved method and apparatus for inspecting chips, preferably for inspecting a plurality of chips formed as a fine pattern on a surface of an object to be inspected.

First, a first group of the invention will be explained.

One visual field of an optical observation system is divided into a plurality of areas. Predetermined good chips, which mean nondefective chips, are arranged sequentially on each area. At a specific position of each area, image data of the predetermined good chips are stored. For example, the predetermined good chips are arranged sequentially on each area by moving a stage in such a condition that the predetermined good chips are held on the stage.

In a preferable embodiment, at least one good chip is selected from the plurality of chips, which are held on the stage, by visual observation in a visual field of the optical observation system. Some nondefective or good chips are used as the predetermined good chips. By moving the stage, the predetermined good chips are moved sequentially to each area. At the position of each area, the image data of the good chips are stored and memorized. When the other plurality of chips are inspected, the good chips are memorized and the plurality of chips to be inspected are compared on the basis of the image data so as to obtain a difference on the images. Thereby, defects and foreign objects or the like to be inspected in the plurality of chips are detected.

An apparatus for inspecting chips according to the first group of the invention comprises a stage and an observation part. The stage moves in a certain direction while it holds a plurality of chips. The observation part is provided for observing the plurality of chips held on the stage in the visual field of the optical observation system. One visual field of the optical observation system is divided into a plurality of areas. Predetermined good chips are arranged sequentially on each area. At a position of each area, image data of the predetermined good chips are stored.

Preferably, the plurality of chips, which are held on the stage, are observed by visual observation in the visual field of the optical observation system. Predetermined good chips are selected. Image data of the good chips thus selected are stored and memorized. In addition, a plurality of chips to be inspected and the good chips memorized in advance are compared on the basis of the image data so as to obtain a difference on both images. Thereby, defects and foreign objects or the like in a pattern are detected.

In one preferred embodiment, a fine pattern (a plurality of chips), which is formed on a surface of an object to be inspected, such as wafers or the like mounted on a stage, are observed by an observation part and stored as image data. The plurality of chips to be inspected are compared with the image of the nondefective pattern memorized in advance so as to obtain the difference on the images. Thereby, defects and foreign objects or the like in the pattern are detected.

In one visual field of the observation image, a plurality of chips can be observed. A plurality of areas are so formed as to be defined by one chip, and the visual field is equally divided. The image of good chips is learned by arranging the same nondefective or good chip on each area.

When the plurality of chips are observed in one visual field, for example, one visual field is divided into three areas in the length direction and three areas in the width direction (total 9 areas). Predetermined good chips are arranged on each area. Learning is carried out at each area.

A stage is constituted so as to be movable in a certain direction while it holds a plurality (9×N) of chips. The stage has a parallel movement in X-Y direction and rotational movement at θ degrees. In addition, the observation part is constituted by means of the optical observation system and CCD sensor or the like, so that the plurality of chips (9 chips) held on the stage can be observed in one visual field.

Further, the apparatus for inspecting chips is provided with a processor, controller, output part (monitor etc.) and input part (keyboard, control stick, mouse, etc.).

Next, a second group of the invention will be explained.

One visual field of an optical observation system is divided into a plurality of areas. When the plurality of good chips are observed in one visual field, coordinates of each good chip are memorized. The good chips in the visual field during learning are observed to obtain the image of the area as a learned image. For example, the chips are arranged sequentially on each area by moving a stage in such a condition that the chips are held on the stage.

In a preferred embodiment, a master is formed by integrating learned results.

An apparatus for inspecting chips according to the second group of the invention comprises a stage and an observation part. The stage moves in a certain direction while it holds a plurality of chips. The observation part is provided for observing the plurality of chips held on the stage in the visual field of the optical observation system. One visual field of the optical observation system is divided into a plurality of areas. When the plurality of good chips are observed in one visual field, coordinates of each good chip are memorized and the good chips in the visual field during learning are recognized so as to obtain the image of the area as a learned image.

Preferably, the plurality of chips, which are held on the stage, are observed by visual observation in the visual field of the optical observation system. Good chips are recognized. Image data of the good chips recognized are stored and memorized. Further, the plurality of chips to be inspected and good chips memorized in advance are compared on the basis of the image data so as to obtain a difference on the images. Thereby, defects and foreign objects or the like in the pattern are detected.

In a preferred embodiment, in one visual field of the observation image, an apparatus for inspecting chips, which can observe a plurality of chips, is characterized as follows.

A plurality of areas are defined by one chip and formed so as to divide the visual field equally. At each area, the same good chips are arranged. Thereby, the nondefective image is learned. Coordinates of the good chips are memorized. Thereby, when the plurality of good chips are present in one visual field during learning, the learned image is obtained at the area where each good chip exists. Thus, learning the good chips is carried out efficiently.

In addition, the stage is constituted so as to be controllable in such a way that each good chip obtains a learned image concerning the whole areas in one visual field.

In addition, operation is directed to the operator.

When the plurality of chips are observed in one visual field, for example, one visual field is divided into three areas in the length direction and three areas in the width direction (total 9 areas). Predetermined good chips are arranged on each area. Learning is carried out at each area.

A stage is constituted so as to be movable in a certain direction when it holds a plurality (9×N) of chips. The stage has a parallel movement in X-Y direction and rotational movement at θ degrees. In addition, the observation part is constituted by means of the optical observation system and CCD sensor, or the like, so that the plurality (9) chips held on the stage can be observed in one visual field.

Further, the apparatus for inspecting chips is provided with a processor, controller, output part (monitor etc.) and input device (keyboard, control stick, mouse, etc.).

In inspecting, a fine pattern consisting a plurality of chips, which is formed on a surface of an object to be inspected such as a wafer or the like mounted on the stage, is observed by the observation part and stored as the image data. A plurality of the chips to be inspected are compared with the image of the nondefective or good pattern memorized in advance so as to obtain the difference on the image. Thereby, defects and foreign objects or the like in the pattern are detected.

DESCRIPTION OF EMBODIMENTS

First, an embodiment according to a first group of the invention will be explained.

Embodiment 1

Figure 1:
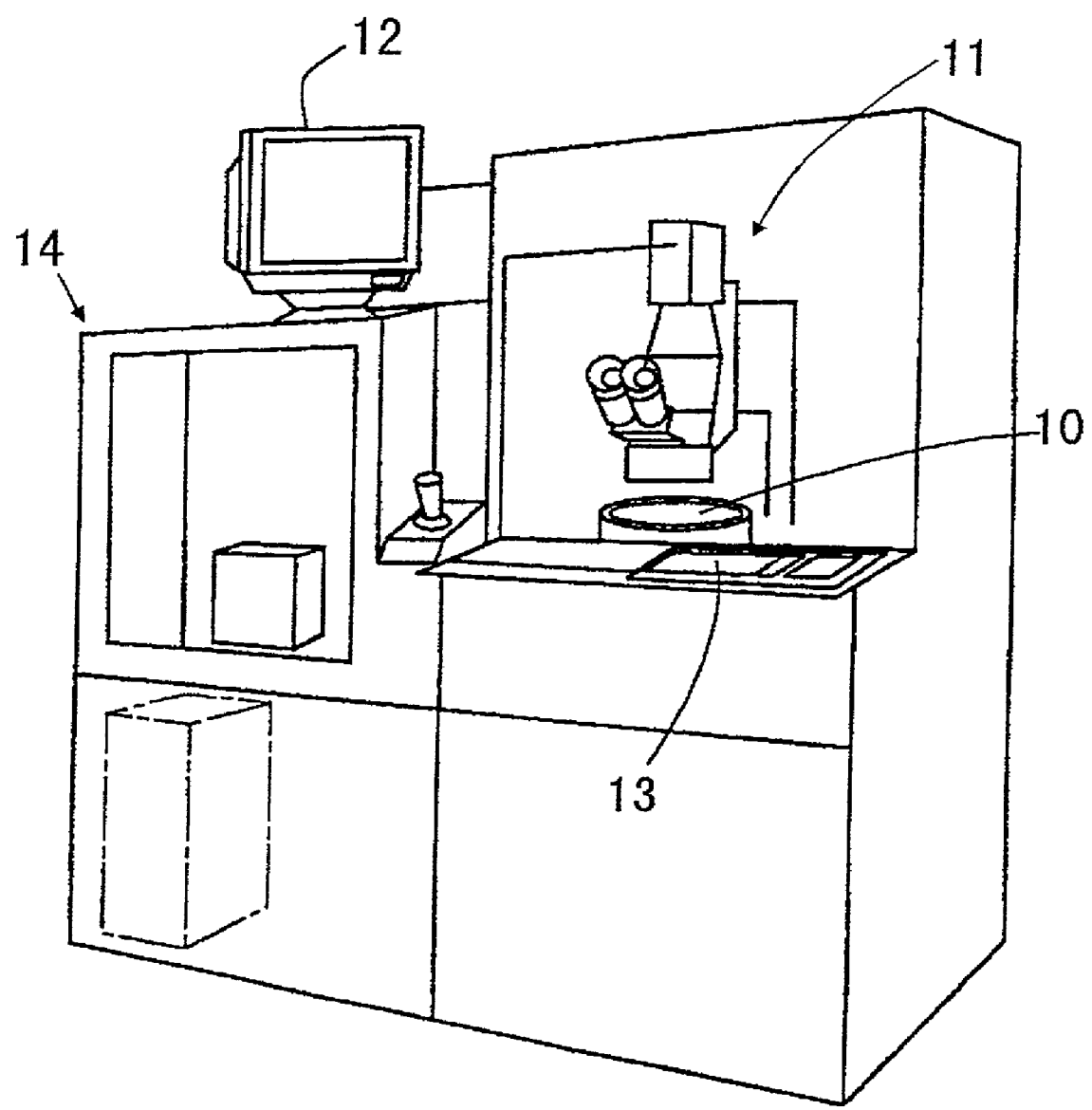
FIG. 1 is a schematic perspective view showing an apparatus for inspecting chips according to one embodiment of a first group of the invention.
Figure 4:
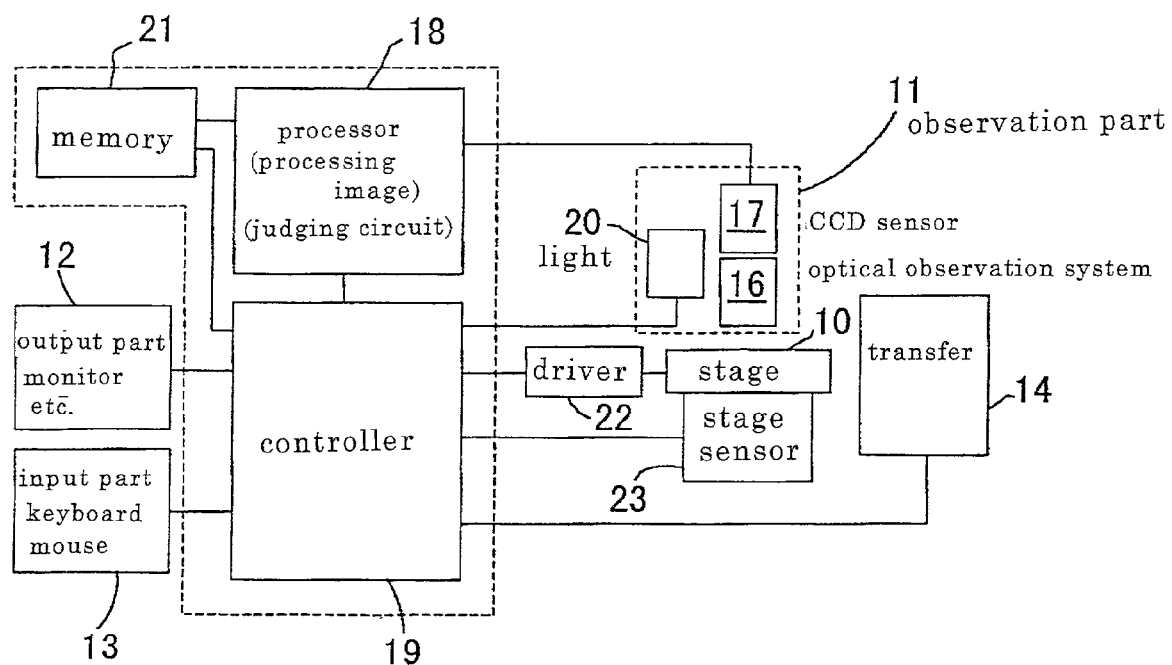
FIG. 4 shows relationships among main components in a apparatus for inspecting chips.

An apparatus for inspecting chips comprises, as shown in FIG. 1 and FIG. 4, a stage 10 and an observation part 11. The stage 10 is constituted so as to be movable in a certain direction while it holds a plurality of chips, which are formed on the surface of a wafer. The observation part 11 is provided for observing the plurality of chips in one visual field while they are held on the stage 10.

The observation part 11 has an optical observation system 16, a CCD sensor 17, a light 20, and so on.

The stage 10 can move in a parallel direction to the X-Y direction, and rotate at θ degrees.

In addition, the apparatus for inspecting chips has a processor 18, a controller 19, an output part (monitor etc.) 12, an input part (keyboard, control stick, mouse etc.) 13, a wafer handler 14, a memory 21, a driver 22 for driving the stage 10, a sensor 23 for detecting a position of the stage 10, and so on.

A method for inspection will be explained as follows.

The plurality of chips are formed as a fine pattern on a surface of the wafer mounted on the stage 10. The plurality of chips are observed by the observation part 11, stored as image data, and compared with an image of the pattern of good chips memorized in advance so as to obtain a difference on the image. Thereby, defects and foreign objects or the like in the pattern are detected.

For example, a plurality of silicon wafers to be inspected are set on the handler 14. A circuit pattern (fine pattern with μ order) of the chips formed on each silicon wafer is transferred to the stage 10, where defects of the chips of each wafer are inspected. Particularly, small foreign objects and defects on the wafer are inspected.

Thus, the simple wafer, which is set on a tape frame and diced in advance, is inspected automatically. Thereby, each chip is judged to pass or not.

Preferably, an algorism is introduced for learning good chips and detecting defects by matching process with high accuracy. Thereby numerous image data are calculated at high speed.

One example of learning steps will be explained concretely by referring to FIGS. 2A~2D.

One example is explained in which a total of nine chips are observed and inspected as one unit wherein the chips are arranged in a three by three manner along each length and width in one observation field of an optical system of the observation part 11.

Figure 2A:
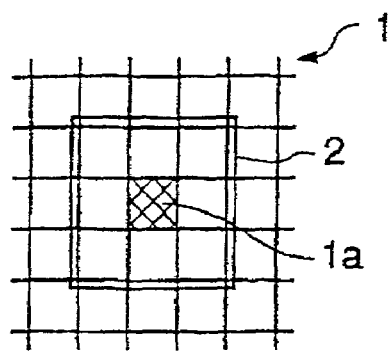
FIGS. 2A~2D are explanatory views showing an example of relationship between one visual field of the optical observation system and the predetermined good chips.

First, in FIG. 2A, optional nine chips 1 in a plurality of chips are arranged in one visual field 2. At least one chip 1a among them is judged to be nondefective or not by visual observation.

Figure 2B:
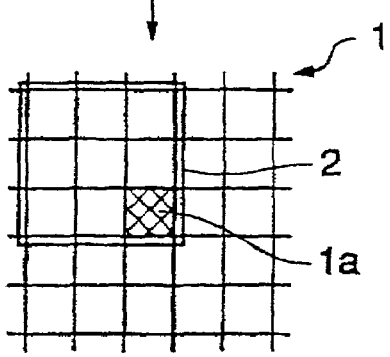

As shown in FIG. 2B, the stage 10 is moved in such a way that the good chip 1a, which is judged to be nondefective, positions at a bottom right-hand corner in the same visual field of the optical observation system. At the position, image data of the good chip 1a are stored.

Figure 2C:
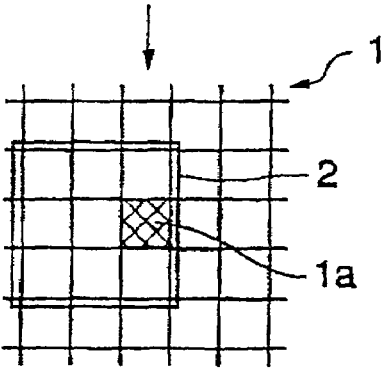

Next, as shown in FIG. 2C, the stage 10 is moved in such a way that the good chip 1a, which is judged to be nondefective, is positioned at a middle right-hand row in the same visual field of the optical observation system. At the position, image data of the same good chip 1a are stored.

Thus, the stage 10 is moved in such a way that the same good chip 1a is positioned at each specific position of the nine chips in the same visual field (namely the nine chip positions to the top right-hand row). At each specific position, the image data of the same good chip 1a are stored.

Figure 2D:
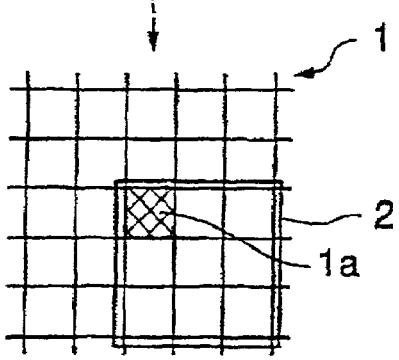

FIG. 2D shows a specific position of the final chip.

As mentioned above, a basic pattern of the image data of the good chips are stored and memorized into the memory 21 in advance.

Preferably, the foregoing learning step is repeated ten times or more for different good chips. The image data of the good chips stored are processed by the processor 18. Then the image data of the good chips processed are memorized in the memory 21 as a good master. If necessary, the master can be modified.

Numerous wafers are inspected by use of such a master.

One example of inspecting steps will be explained as follows.

(1) One piece of wafer is taken out from a cassette of the transfer or handler 14 and transferred to the observation part 11. In other words, the single wafer (tape frame wafer) is transferred to the stage 10. Further, it is carried out at the following step (4).

(2) Rotation-dislocation and center-dislocation of the wafer is modified by an aligner.

(3) The wafer is taken out from the aligner and transferred onto the stage 10.

(4) Rotation is slightly modified around θ axis on the stage 10.

(5) The light 20 is turned on at a certain level. The stage 10 is moved to a first position for inspection.

(6) If necessary, automatic focus and fine alignment modification are carried out.

(7) One part of the image of the plurality of chips or one single chip is enlarged and stored in an image-processing unit of the processor 18.

(8) The stage 10 is moved along a predetermined route by means of the driver 22. In addition, the position of the stage 10 is detected by the sensor 23.

(9) The image data of the good chip, which is learned in advance, is set as a standard data. The image positioning is made. The plurality of chips to be inspected are inspected. PAD • bump inspection or examination is carried out. Nondefective or defective is judged.

(10) The foregoing steps (7)~(9) are repeated. After all the chips on the wafer are inspected or examined, the wafer is transferred from the stage 10 and received in the cassette of the transfer 14.

In addition, preferably the images of the good chips are learned in advance, while the inspecting conditions etc. are set for making a recipe for inspection.

Figure 3:
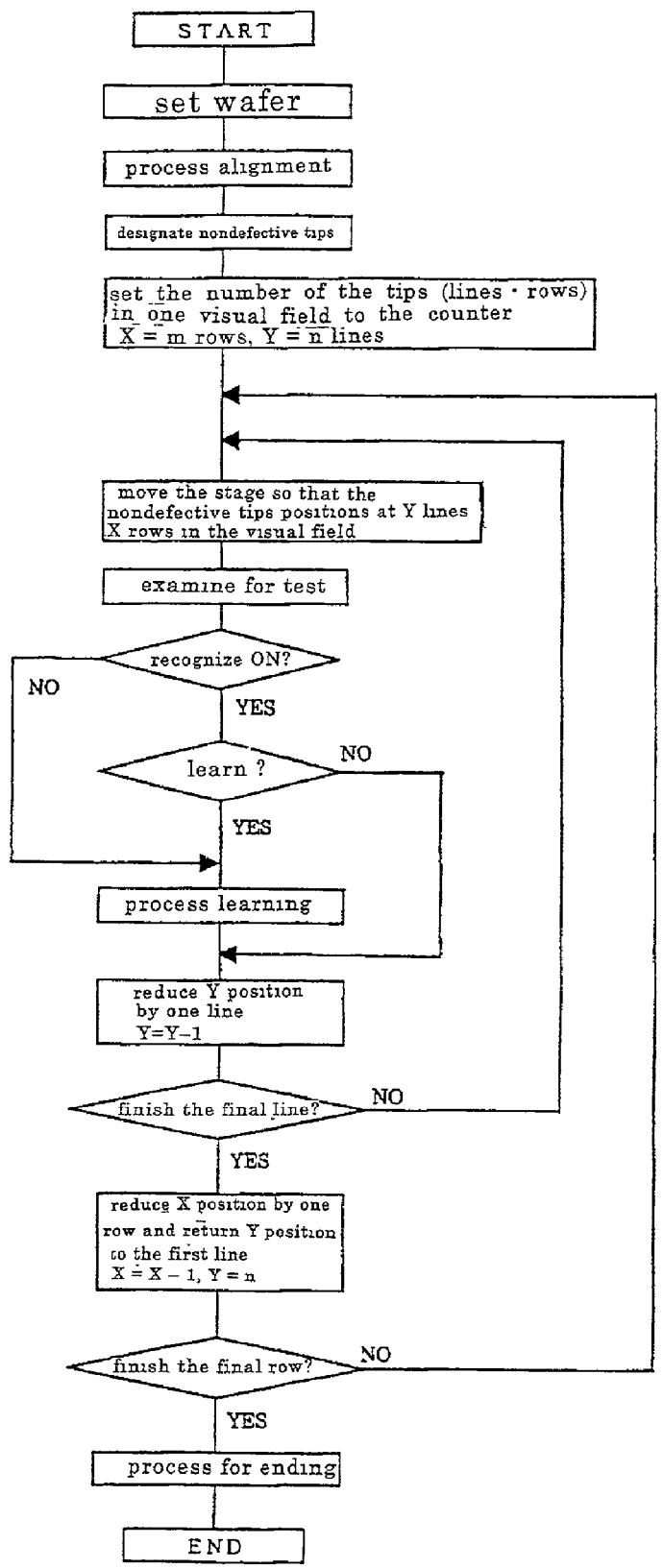
FIG. 3 is a flow chart showing one example of a flow of a learning process according to the first group of the invention.

The flow of the learning process will be explained by referring to FIG. 3.

First, the apparatus is started by operating the input part 13. Then, one piece of wafer is set on the stage 10. Next, alignment process is carried out there. One good chip is selected by visual observation from the plurality of chips in the visual field of one optical observation system. The good chip is designated by operating the input part 13. Additionally, the number of the chips (lines and rows) in one visual field is set by a counter in the input part 13. For example, it is set as X=m rows, Y=n lines.

The stage 10 is moved in such a way that one good chip is positioned at a certain position (for example a specific position at the bottom right-hand corner) of Y rows and X lines in the visual field.

The result of the inspecting is confirmed. If it is confirmed to be nondefective, it is learned. If it is not nondefective, Y position is reduced by one line without learning. That is, it results in Y=Y−1.

Such studies are carried out through the final line.

When it ends with the final line, X position is reduced by one row. Y position is returned to the first line.

$$X=X-1, Y=n$$

The foregoing process is carried out through the end with the final row.

When it ends with the final row, an end process is carried out.

Next, an embodiment according to a second group of the invention will be explained.

Embodiment 2

An apparatus for inspecting chips comprises, as shown in FIG. 1 and FIG. 4, a stage 10 and an observation part 11 which is similar to the foregoing embodiment according to the first group of the invention. The stage 10 is so constituted as to be movable in a certain direction while it holds a plurality of chips, which are formed on the surface of a wafer. The observation part 11 is provided for observing the plurality of chips in one visual field while they are held on the stage 10.

The observation part 11 has an optical observation system 16, a CCD sensor 17, a light 20, and so on.

The stage 10 can move in a parallel direction to the X-Y direction, and rotate at θ degrees.

In addition, the apparatus for inspecting chips includes a processor 18, a controller 19, an output part (monitor etc.) 12, an input part (keyboard, control stick, mouse etc.) 13, a wafer handler 14, a memory 21, a driver 22 for driving the stage 10, a sensor 23 for detecting a specific position of the stage 10, and so on.

A method for inspecting chips will be explained as follows.

The plurality of chips are formed as a fine pattern on a surface of the wafer mounted on the stage 10. The plurality of chips are observed by the observation part 11, stored as image data, and compared with an image of the pattern of good chips 1a, 1b, 1c, 1d memorized in advance so as to obtain a difference on the image. Thereby, defects and foreign objects or the like in the pattern are detected.

For example, a plurality of silicon wafers to be inspected are set on the handler 14. A circuit pattern (fine pattern with μ order) of the chips 1 formed on each silicon wafer is transferred to the stage 10, wherein defects of the chips 1 of each wafer are inspected. Particularly, small foreign objects and defects on the wafer are inspected.

Thus, the simple wafer, which is set on a tape frame and diced in advance, is inspected automatically. Thereby, each chip is judged to pass or not.

Preferably, an algorism is introduced for learning good chips 1a~1e and detecting defects by matching process with high accuracy. Thereby, numerous image data are calculated at a high speed.

One example of learning steps will be explained concretely by referring to FIGS. 5A~5D.

One example is explained in which a total of nine chips are observed and inspected as one unit wherein the chips are arranged in a three by three manner along each length and width in one observation field of an optical system of the observation part 11.

Figure 5A:
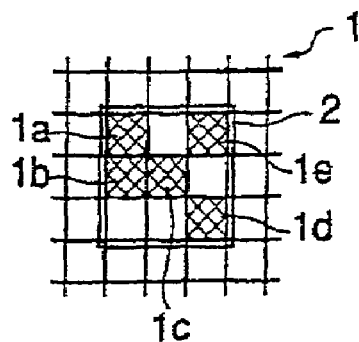
FIGS. 5A~5D are explanatory views showing an example of a relationship between one visual field of an optical observation system and common good chips.

First, in FIG. 5A, optional nine chips 1 in a plurality of chips 1 are arranged in one visual field 2. In the visual field 2, the chips are judged to be nondefective or not by visual observation. For example, 1a~1e are nondefective, and the others are not nondefective in FIG. 3.

Figure 5B:
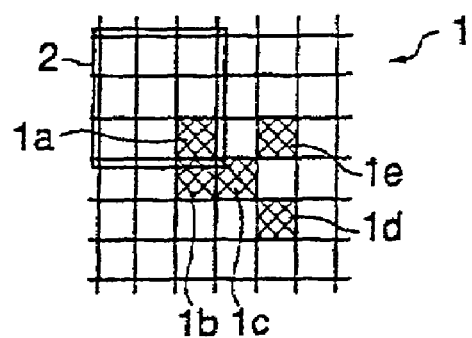

As shown in FIG. 5B, the stage 10 is moved in such a way that the good chip 1a, which is judged to be nondefective, is positioned at a bottom right-hand corner in the same visual field of the optical observation system. At the position, image data of the good chip 1a are stored.

Figure 5C:
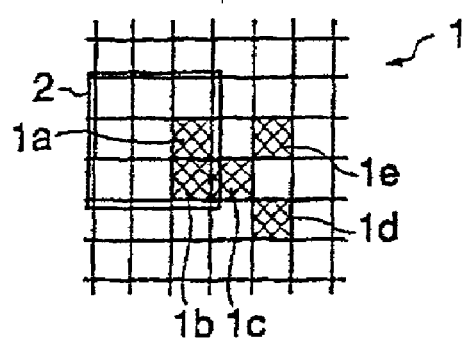

Next, as shown in FIG. 5C, the stage 10 is moved in such a way that the good chip 1a, which is judged to be nondefective, is positioned at a middle right-hand row in the same visual field of the optical observation system. At the position, image data of the same good chip 1a are stored.

Thus, the stage 10 is moved in such a way that the same good chip 1a is positioned at each specific position of the nine chips in the same visual field (namely the nine areas to the top right-hand row). At each specific position, the image data of the same good chip 1a are stored.

However, at the areas of the other chips 1b~1e, which are judged to be nondefective, the image data of the chip 1a are not stored, but the image data of the chips 1b~1e are stored. At these specific positions, the positions are shifted by one area.

Figure 5D:
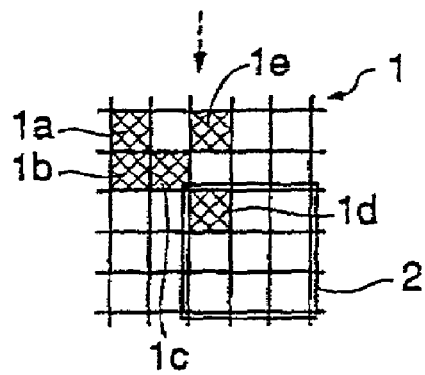

FIG. 5D shows the position wherein the last image data are stored.

As mentioned above, the image data of the pattern consisting of nine areas relating to the good chips are stored. Further, they are memorized in the memory 21 in advance.

Preferably, the foregoing learning step is repeated ten times or more for different good chips. The image data of the good chips stored are processed by the processor 18. Then the image data of the good chips processed are memorized in the memory 21 as a good master. If necessary, the master can be modified.

Numerous wafers are inspected by use of such a master.

One example of inspecting steps will be explained as follows.

(1) One piece of wafer is taken out from a cassette of the handler or transfer 14 and transferred to the observation part 11. In other words, the single wafer (tape frame wafer) is transferred to the stage 10. Further, it is carried out by the following step (4).

(2) Rotation-dislocation and center-dislocation of the wafer is modified by an aligner.

(3) The wafer is taken out from the aligner and transferred onto the stage 10.

(4) Rotation is slightly modified around θ axis on the stage 10.

(5) The light 20 is turned on at a certain level. The stage 10 is moved to a first position for inspecting.

(6) If necessary, automatic focus and fine alignment modification are carried out.

(7) One part of the image of the plurality of chips or one chip is enlarged and stored in an image-processing unit of the processor 18.

(8) The stage 10 is moved along a predetermined route by the driver 22. In addition, the specific position of the stage 10 is detected by the sensor 23.

(9) The image data of the good chip, which is learned in advance, is set as a standard (master). The image is specifically positioned. The plurality of chips to be inspected are inspected. PAD • bump inspecting is carried out. Nondefective or defective is judged for each chip.

(10) The foregoing steps (7)~(9) are repeated. After all the chips on the wafer are inspected, the wafer is transferred from the stage 10 and received in the cassette of the transfer 14.

In addition, preferably the images of the good chips are learned in advance, while the inspecting conditions etc. are set for making a recipe for inspecting.

Figure 6:
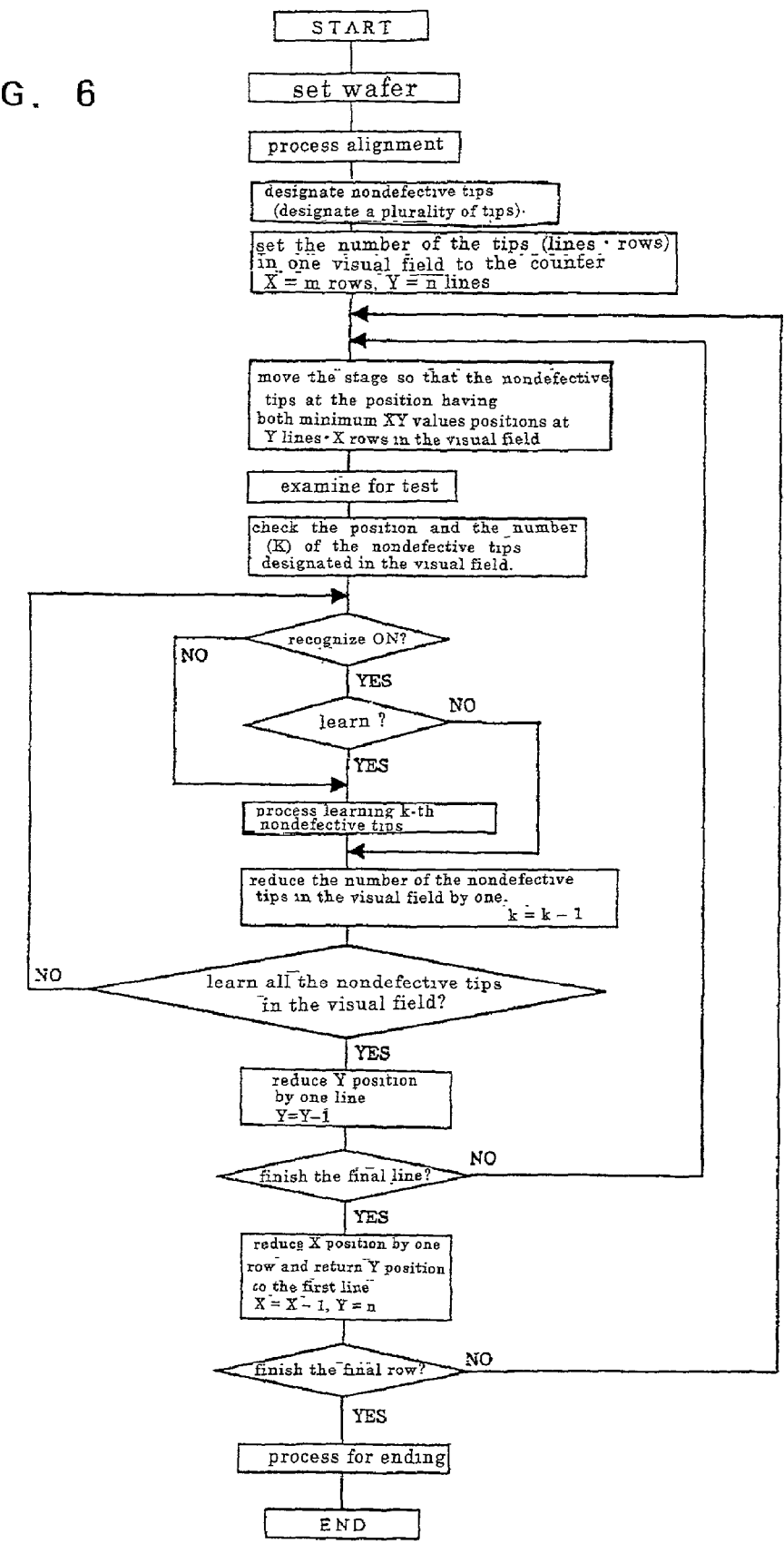
FIG. 6 is a flow chart showing one example of a flow of a learning process according to the second group of the invention.

The flow of the learning process will be explained by referring to FIG. 6.

First, the apparatus is started by operating the input part 13. Then, one piece of wafer is set on the stage 10. Next, alignment process is carried out there. Good chips 1a~1e are selected by visual observation from the nine chips in the visual field of one optical observation system. The good chips 1a~1e are designated by operating the input part 13. Additionally, the number of the chips (lines and rows) in one visual field is set by a counter of the input part 13. For example, it is set as X=m rows, Y=n lines.

The stage 10 is moved in such a way that the good chips 1a~1e at the position having both minimum XY values are positioned at Y lines and X rows in one visual field.

The position and the number (K) of the good chips 1a~1e designated in the visual field are checked.

The inspected results of the good chips 1a~1e are checked. If they are nondefective, they are learned. If they are defective, they are not learned.

The Kth good chip is learned and processed. The number K of good chips is reduced by one. Namely, K=K−1. This process is carried out for all good chips in one visual field. In addition, Y position is reduced by one line. Namely, Y=Y−1.

Such learning step is carried out through the final line.

When it ends with the final line, X position is reduced by one row. Y position is returned to the first line.

$$X=X-1, Y=n$$

The foregoing process is carried out through the end with the final row.

When it ends with the final row, the end process is carried out.

According to the invention, influence by distortion of the optical observation system can be eliminated for all groups, which enables inspecting with high accuracy.

In addition, it can minimize the time for inspecting good chips by visual observation during the learning step. Therefore, learning can be done effectively and quickly.

In addition, load for the operator during the learning step is largely reduced by minimizing visual observation for inspecting.

What is claimed is:

1. A method for inspecting a plurality of chips formed as a fine pattern on a surface of an object to be inspected, comprising the steps of:
    observing the plurality of chips within one visual field of an optical observation system;
    dividing said one visual field of the optical observation system into a plurality of areas which correspond to the plurality of chips, respectively;
    determining a good chip or chips among the plurality of chips;
    arranging the determined good chips sequentially on the plurality of areas;
    storing each image of the determined good chips as image data at each of the areas; and
    inspecting the plurality of chips based on the stored image data,
    wherein the determined good chips are arranged sequentially on each of the areas by moving a stage relative to the optical observation system, while the determined good chips are held on the stage.

2. The method as defined in claim 1, comprising:
    selecting good chips from the plurality of chips held on the stage by visual observation in said one visual field of the optical observation system;
    moving the selected good chips as determined good chips sequentially to each of the areas by moving the stage when other chips are to be inspected;
    comparing image data of the determined good chips to said other chips so as to obtain a difference of the image data; and
    detecting defects or foreign objects in the plurality of chips.

3. The method as defined in claim 1, wherein, when the plurality of good chips are observed in said one visual field, image data of each area for the determined good chips is stored.

4. An apparatus for inspecting a plurality of chips formed as a fine pattern formed on a surface of an object to be inspected, comprising:
    means for observing the plurality of chips in one visual field of an optical observation system;
    means for dividing said one visual field of the optical observation system into a plurality of areas;
    means for determining a plurality of good chips in said one visual field;
    means for arranging the determined good chips sequentially on each of the areas, and
    means for storing each image of the determined good chips as image data at each of the areas,
    wherein the determined good chips are arranged sequentially on each of the areas by moving a stage relative to the optical observation system, while the determined good chips are held on the stage.

5. The apparatus as defined in claim 4, wherein, when the plurality of good chips are observed in said one visual field, the image data of each area for the determined good chips is stored.

6. The apparatus as defined in claim 4, further comprising:
    means for holding the good chips on a stage;
    means for moving the stage relative to the optical observation system so as to arrange the good chips sequentially to each of the areas.

7. A method for inspecting a plurality of chips formed as a fine pattern on a surface of an object to be inspected, comprising:
    dividing a visual field of an optical observation system into a plurality of areas which correspond to respective chips of the plurality of chips;
    determining at least one good chip among the plurality of chips;
    arranging the determined good chips sequentially on the areas of the plurality of areas;
    storing an image as image data of the determined good chips at each of the areas of the plurality of areas; and
    inspecting the plurality of chips based on the stored image data,
    wherein the determined good chips are arranged sequentially on each of the areas by moving a stage relative to the optical observation system, while the determined good chips are held on the stage.

* * * * *